United States Patent
O'Rourke et al.

(10) Patent No.: US 7,284,053 B1
(45) Date of Patent: Oct. 16, 2007

(54) SYSTEM AND METHOD FOR LOADBALANCING IN A NETWORK ENVIRONMENT

(75) Inventors: Chris O'Rourke, Apex, NC (US); Ashish A. Chandwadkar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 720 days.

(21) Appl. No.: 10/404,311

(22) Filed: Mar. 31, 2003

(51) Int. Cl.
G06F 15/173 (2006.01)
(52) U.S. Cl. .................................. 709/226
(58) Field of Classification Search ............... 709/226
See application file for complete search history.

(56) References Cited

U.S. PATENT DOCUMENTS

| | | | |
|---|---|---|---|
| 6,393,458 B1 | 5/2002 | Gigliotti et al. ............ 709/203 |
| 6,434,618 B1 | 8/2002 | Cohen et al. ............... 709/228 |
| 6,442,165 B1 | 8/2002 | Sitaraman et al. ....... 370/395.4 |
| 6,473,802 B2 | 10/2002 | Masters ..................... 709/229 |
| 6,484,143 B1 | 11/2002 | Swildens et al. .............. 705/1 |
| 2003/0076803 A1* | 4/2003 | Chuah ......................... 370/338 |
| 2003/0112782 A1* | 6/2003 | Mizell et al. ............... 370/338 |
| 2003/0169771 A1* | 9/2003 | Ahn et al. .................. 370/497 |
| 2004/0001517 A1* | 1/2004 | Lamberton et al. ......... 370/522 |

\* cited by examiner

*Primary Examiner*—Jason Cardone
*Assistant Examiner*—Minh-Chau Nguyen
(74) *Attorney, Agent, or Firm*—Baker Botts L.L.P.

(57) ABSTRACT

A method for loadbalancing in a network environment is provided that includes receiving a primary create request from an end user for a communications link provided by a network node and communicating a response to the end user in order to establish a communication session. A selected one of a plurality of network nodes is identified to facilitate the communication session based on a number of packet data protocol (PDP) contexts associated with one or more of the network nodes.

18 Claims, 3 Drawing Sheets

| GGSN NUMBER | PRIMARY (NSAPI) | SECONDARY (NSAPI) | CONNECTION COUNTER | MESSAGE SEQUENCE NUMBER (FOR DELETE REQUEST) | TIMEOUT | IP ADDRESS | GSN TYPE | RECOVERY INFORMATION ELEMENT | MISC |
|---|---|---|---|---|---|---|---|---|---|
| 1 | 4 | 3 | 7 | | | | | | |
| 2 | 7 | 1 | 8 | | | | | | |
| 3 | 8 | 0 | 8 | | | | | | |
| 4 | 2 | 2 | 4 | | | | | | |
| ... | ... | ... | ... | ... | ... | ... | ... | ... | ... |

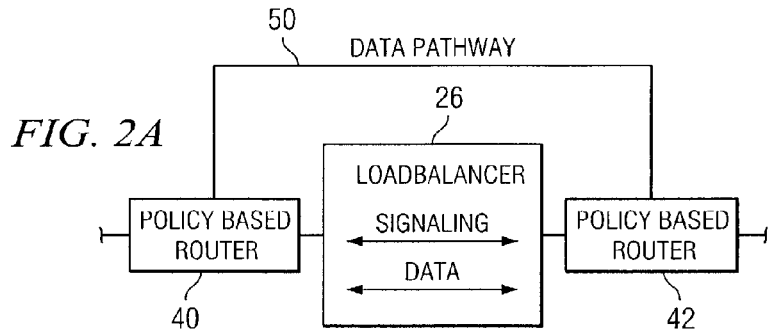
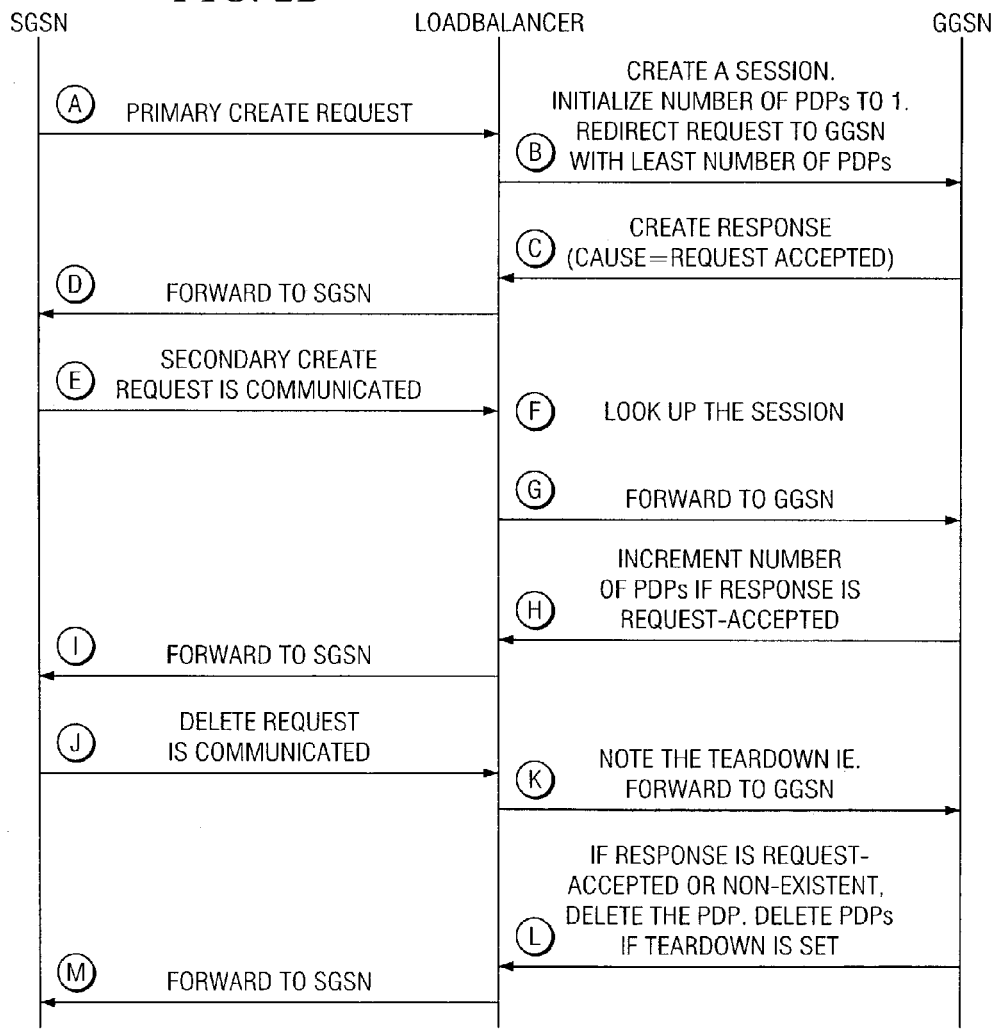

SYSTEM AND METHOD FOR LOADBALANCING IN A NETWORK ENVIRONMENT

TECHNICAL FIELD OF THE INVENTION

This invention relates in general to the field of communications and more particularly to a system and method for loadbalancing in a network environment.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic. Communication tunnels or links may be used in order to establish or to gain access to a network whereby an end user or an object may initiate a tunneling protocol by invoking a selected location or a network node. The network node or central location may then provide a platform that the end user may use to conduct a communication session.

As the subscriber base of end users increases, proper routing and efficient management of communication sessions and data flows becomes even more critical. Having access to, or being aware of, accurate network node activity is important for executing proper loadbalancing techniques. In cases where improper loadbalancing protocols are executed, certain network components may be overwhelmed while other (potentially more capable) network resources remain untapped. This overburdening may decrease throughput and inhibit the flow of network traffic, causing congestion or bottlenecks in the system. Additionally, the overwhelming burden on a single element in the communications flow may decrease bandwidth capabilities and inhibit the ability to accommodate additional communications tunnels or end users.

SUMMARY OF THE INVENTION

From the foregoing, it may be appreciated by those skilled in the art that a need has arisen for an improved communications approach that provides for more accurate loadbalancing based on accurate information associated with communications between two end points or nodes. In accordance with one embodiment of the present invention, a system and method for loadbalancing in a network environment are provided that greatly reduce disadvantages and problems associated with conventional loadbalancing techniques.

According to one embodiment of the present invention, there is provided a method for loadbalancing in a network environment that includes receiving a primary create request from an end user for a communications link provided by a network node and communicating a response to the end user in order to establish a communication session. A selected one of a plurality of network nodes is identified to facilitate the communication session based on a number of packet data protocol (PDP) contexts associated with one or more of the network nodes.

Certain embodiments of the present invention may provide a number of technical advantages. For example, according to one embodiment of the present invention a communications approach is provided that allows a loadbalancer to more accurately distribute work to multiple network nodes. This is a result of a loadbalancer that inspects the primary create requests and, based on the inspection, directs the create request to a network node with the least number of PDP contexts (or "PDPs"). The loadbalancer may further recognize the network node with the least number of PDP contexts by referencing a data structure or table that maintains the number of PDP contexts currently burdening each network node. Such a protocol allows for more effective loadbalancing as data may be properly directed to network nodes that are most capable of accommodating additional traffic flows.

Yet another technical advantage associated with one embodiment of the present invention is the result of the operation of the loadbalancer. The loadbalancer may effectively snoop secondary requests, delete requests, echo activity, or any other suitable information in order to properly assess the workload being placed on each network node. This in turn allows the loadbalancer to efficiently deliver data to an optimal network node. The operation of the loadbalancer may further alleviate strain that is placed on network nodes that continue to receive communication flows when they are incapable of withstanding additional tasks. Moreover, the operation of the loadbalancer allows it to monitor delete requests, handover scenarios, and numerous other configurations that may affect the number of PDP contexts associated with a given network node. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 2A is a simplified block diagram of an alternative embodiment of the communication system;

FIG. 2B is a simplified timing diagram illustrating one example interaction between multiple elements included in the communication system;

DETAILED DESCRIPTION OF EXAMPLE EMBODIMENTS OF THE INVENTION

Figures 1, 2C:
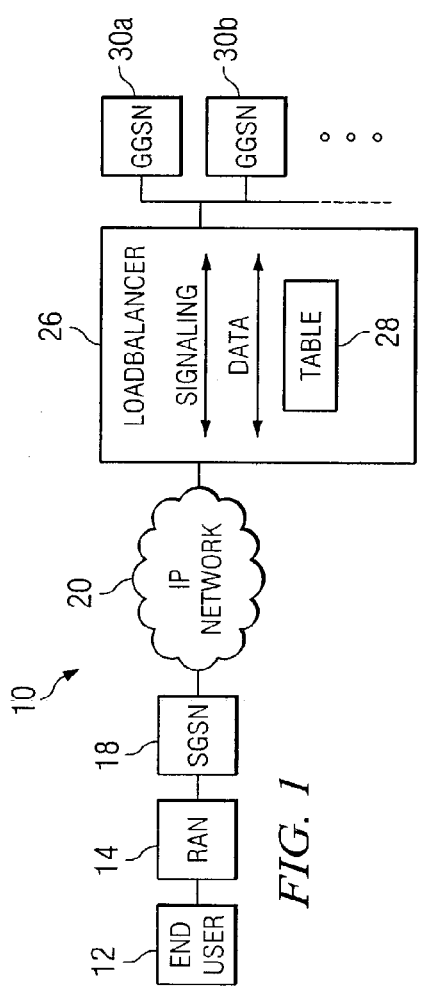
FIG. 1 is a simplified block diagram of a communications system for loadbalancing in a network environment in accordance with one embodiment of the present invention.
FIG. 2C is a simplified block diagram of a table that may be included within a loadbalancer that is provisioned in the communication system.

FIG. 1 is a simplified block diagram of a communication system 10 for communicating data in a network environment. Communication system 10 includes an end user 12, a radio access network (RAN) 14, a serving general packet radio service (GPRS) support node (SGSN) 18, and an internet protocol (IP) network 20. Additionally, communication system 10 may include a loadbalancer 26 (that may include a table 28) and multiple gateway GPRS support nodes (GGSNs) 30a-b. FIG. 1 may be generally configured or arranged to represent a 2.5 G communication architecture applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that includes loadbalancing operations. This may be inclusive of first generation, 2G, and 3G architectures that provide features for workload distribution.

In accordance with the teachings of the present invention, communication system 10 provides a loadbalancing operation that offers optimal communications between end user 12 and selected GGSNs 30*a-b*. Loadbalancer 26 may inspect a create request and, based on the inspection, direct a create request to a selected one of GGSNs 30*a-b* having the least number of packet data protocol (PDP) contexts (or "PDPs"). Many PDPs may flow within a single tunnel and, thus, tracking them effectively is important. Two stages generally exist in communications flows that involve end user 12. A first stage relates generally to initiation (or signaling), whereby a communication session may be prompted by end user 12. A second stage relates generally to the establishment of the communication session or link with corresponding data transfer or information exchange. The initiation stage of the communication session generally requires an invocation of loadbalancer 26. During this stage, a create request from end user 12, and a suitable response generated by a designated GGSN 30*a-b*, may be communicated within communication system 10. Loadbalancer 26 may properly select a given GGSN 30*a-b* based on current PDP context information that it maintains internally.

Loadbalancer 26 may be aware of PDP contexts as they are open and closed. Loadbalancer 26 may monitor primary and secondary PDPs in order to execute more accurate loadbalancing based on accurate loadbalancing metrics. One GTP tunnel (or link) per user may be provided that carries a primary and second PDP context. Multiple contexts allow a network to offer capabilities to be implemented for particular flows (e.g. quality of service, bandwidth allowed, applications allowed, etc.). It is beneficial for loadbalancer 26 to be able to track a number of primaries and secondaries, which are open for a given communication tunnel. Without such a capability, loadbalancer 26 would haphazardly loadbalance based on the number of open communication tunnels, and thereby not account for primary and secondary creates that make up the tunnel. A more accurate assessment of workload being placed on given network nodes may be executed by loadbalancer 26. Loadbalancer 26 may snoop or otherwise glean information associated with both primary and secondary creates in order to effectuate quality loadbalancing in achieving increased granularity in making loadbalancing decisions.

Loadbalancer 26 more accurately distributes work to multiple network nodes by inspecting incoming primary create requests in order to direct the create request to a network node having the least number of PDP contexts. Loadbalancer 26 may further recognize the network node with the least number of PDP contexts by referencing a data structure or table 28 that maintains the number of PDP contexts currently burdening each network node. Such an approach achieves more effective loadbalancing as data may be properly directed to network nodes that are most capable of accommodating additional traffic flows.

Loadbalancer 26 may also effectively snoop secondary requests, delete requests, echo activity, or any other suitable information in order to properly assess the workload being placed on each network node (e.g. GGSNs 30*a-b*). This monitoring allows loadbalancer 26 to efficiently deliver data to an optimal network node. The operation of loadbalancer 26 may further alleviate strain that is placed on network nodes that continue to receive excess communication flows that they are incapable of accommodating. Loadbalancer 26 may also monitor delete requests, handover scenarios, and numerous other configurations that may affect the number of PDP contexts associated with a given network node.

End user 12 is a client or a customer wishing to initiate a communication in communication system 10 via IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

RAN 14 is a communications interface between end user 12 and SGSN 18. RAN 14 may comprise a base transceiver station and a base station controller. The communications interface provided by RAN 14 offers connectivity and allows data to be exchanged between end user 12 and any number of selected elements within communication system 10. RAN 14 facilitates the delivery of a request packet generated by end user 12 and the reception of information sought by end user 12. RAN 14 is only one example of a communications interface between end user 12 and SGSN 18. Other types of communications interfaces may be used for a desired network design based on particular needs.

IP network 20 represents a series of points or nodes of interconnected communication paths for receiving and transmitting packets of information that propagate through communication system 10. IP network 20 may offer a communicative interface between end user 12 and selected GGSNs 30*a-b* and may be any GPRS network, local area network (LAN), wireless local area network (WLAN) metropolitan area network (MAN), wide area network (WAN), virtual private network (VPN), or any other appropriate architecture or system that facilitates communications in a network environment. IP network 20 may alternatively implement any other suitable communication protocol for transmitting and receiving data or information within communication system 10.

SGSN 18 and GGSNs 30*a-b* are network elements that cooperate in order to facilitate a communication session involving end user 12. GGSNs 30*a-b* are communications or network nodes that may be working in conjunction with multiple SGSNs 18 to provide a communications medium in a GPRS service network environment in communicating data exchanges within communication system 10. GGSNs 30*a-b* may be inclusive of a walled garden used to control user access to web content or services. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. GPRS may support multiple internet communication protocols and may enable existing IP, X.25, or any other suitable applications or platforms to operate over GSM connections.

Loadbalancer 26 is an element or a device that receives requests and then distributes those requests to the next available server or node. The available server or node may be any computer or device on a network that manages network resources or that processes data. For example, the network node may be a selected GGSN 30a-b. Such loadbalancing decisions may be executed based on suitable algorithms, software, or hardware provided in loadbalancer 26. Loadbalancer 26 may also include hardware and/or software for directing signaling and data information in communication system 10. Hardware within a switch fabric of loadbalancer 26 may operate to direct information based on IP address data provided in the communication flows. Software within loadbalancer 26 may properly accommodate a signaling pathway for transmissions associated with end user 12 and selected GGSNs 30a-b. Alternatively, this assignment of software and hardware may be combined in any suitable fashion, or switched with software accommodating the data exchange and signaling being managed through hardware where appropriate and according to particular needs.

Loadbalancer 26 may also perform other suitable loadbalancing tasks, such as dividing the amount of work that an element has to do between two or more elements to ensure more work gets done in the same amount of time and, in general, accommodating end users 12 more quickly. Loadbalancer 26 may be replaced by any other suitable network element such as a router, a switch, a bridge, a gateway, or any other suitable element, component, device, or object operable to facilitate data reception or transmission in a network environment. Additionally, loadbalancer 26 may include any appropriate hardware, software, (or a combination of both) or any appropriate component, device, element, or object that suitably assists or facilitates traffic management in a network. Additionally, any of the operations of SGSN 18 or GGSNs 30a-b may be assisted by loadbalancer 26 where appropriate and in accordance with particular needs.

In operation of an example embodiment, loadbalancer 26 may execute loadbalancing decisions for selected GGSNs 30a-b. Inbound and outbound signaling traffic to and from SGSN 18 and GGSNs 30a-b may flow through loadbalancer 26 (in whole or in part). Loadbalancer 26 may filter the traffic using any appropriate criterion, such as source IP address, destination IP address, source port, destination port, protocol tuple, or any other suitable parameter or characteristic. Filtering may be implemented to inspect all signaling traffic to and from SGSN 18 and selected GGSNs 30a-b (that may be co-located in a GGSN farm). Loadbalancer 26 may initially create a session on the first (primary) create request. A session may be identified by the client (SGSN) IP address and port, server (GGSN) IP address and port, protocol and session key, or any other suitable parameters where appropriate. For GTP version one, loadbalancer 26 may create a session per tunnel end point identifier (TEID) and thus a session on loadbalancer 26 may identify all PDP contexts (one primary and several secondary) with the same PDP address and access point name (APN) combination.

Loadbalancer 26 may inspect the cause code in the create request. If it is a success, loadbalancer 26 may increment a connection counter. If a failure is indicated, loadbalancer 26 may delete the session. The subsequent secondary create request may be redirected to a selected GGSN 30a-b having the least number of PDP contexts and the connection counter may be updated based on the cause code in the create response. For GTP version zero, each create request may be analogous to a primary create request. Accordingly, loadbalancer 26 may create a session per tunnel identifier (TID) or PDP.

In accordance with an alternative embodiment of communication system 10, after the communication session is initiated, loadbalancer 26 may be removed from the communications pathway allowing for a more direct data transfer between end user 12 and a selected GGSN 30a-b. This may be accommodated via IP network 20. Thus, loadbalancer 26 operates to be only directly involved in initiation of the communication session to operate as a request broker for the establishment of one or more communication tunnels. After the establishment of the tunnels, the data is effectively handed off such that the signaling information is required to propagate through one portion of loadbalancer 26 and data through another. This is accomplished in conjunction with port-level filtering for GPRS data and signaling.

The alleviation of responsibilities or duties that are delegated to loadbalancer 26 may be accomplished in several ways. For example, FIG. 1 illustrates one example in which loadbalancer 26 may include suitable hardware and/or software for distinctly or separately managing a signaling pathway and a data pathway. Thus, software may be used within loadbalancer 26 to facilitate the propagation of signaling data between end user 12 and a selected GGSN 30a-b. Hardware, for example a component within a loadbalancing switch of loadbalancer 26, may be implemented in order to facilitate data exchanges between end user 12 and a selected GGSN 30a-b. This separation of signaling decreases the burden on loadbalancer 26 and further simplifies the configuration offered by communication system 10. In an alternative embodiment, this separation of signaling and data may be accomplished using specific routing elements or policy management units. Such an architecture is described in detail below with reference to FIG. 2A.

The initiation and establishment protocol implemented in communication system 10 operates to provide a significant reduction in communications traffic for loadbalancer 26. As a result, loadbalancer 26 may offer increased throughput and decreased reliance on a central location. This feature may further provide the opportunity for loadbalancer 26 to be isolated from excessive central processing unit (CPU) cycles that may be intensive and require substantial work to be performed by loadbalancer 26. This technique may also allow loadbalancer 26 to participate in only simple information transfers or data packet switching without requiring loadbalancer 26 to modify addressing information or to process specific data passing through loadbalancer 26. Loadbalancer 26 may also avoid various types of GTP header inspections, which would otherwise significantly slow loadbalancing operations. With the reduced responsibilities of loadbalancer 26, communication system 10 provides an architecture that is able to accommodate greater bandwidth and allow for enhanced and more efficient communications.

FIG. 2A is a simplified block diagram illustrating an alternative embodiment of communication system 10. A set of policy based routers 40 and 42 may be coupled to loadbalancer 26 in order effectuate port-level filtering. Although illustrated as external to loadbalancer 26, policy based routers 40 and 42 may be included therein. Policy based routers 40 and 42 operate to facilitate a data pathway 50 that allows data to propagate between end user 12 and selected GGSNs 30a-b. Thus, policy based routers 40 and 42 may operate to provide a protocol that alleviates traffic and responsibilities associated with loadbalancer 26 in order to properly accommodate data in communication system 10. Signaling information may still propagate through loadbalancer 26, for example through software included therein in an example embodiment.

With respect to data pathway 50, data may propagate from SGSN 18 to selected GGSNs 30a-b. The source IP may remain as the selected GGSN 30a-b. The destination address may correspond to the selected GGSN 30a-b. Policy based routers 40 and 42 may send that information along the alternative path through data pathway 50. Communications in the other direction operate in a similar manner except that such communications may key on the source port instead of the destination port. Thus, a bypassing mechanism is provided to loadbalancer 26 for a substantial part of the communication session. After the initial change in address, port-level filtering is then executed in order to effectuate management of information flows.

Loadbalancer 26 may inspect the communication flow between GGSN 30a or 30b that is communicated to SGSN 18 but not necessarily change it. Loadbalancer 26 is aware of all signaling flows at this stage in the protocol and the communication tunnel is now established and functional. Both SGSN 18 and a selected GGSN 30a or 30b are aware of the communication tunnel. Thus, the protocol implemented allows for an execution of a handoff. It further allows an easy manipulation (i.e. not requiring significant processing) in the end point address from the virtual to the real address.

Policy based routers 40 and 42 may be configured such that if the destination port equals 2123, information is routed to signaling associated with loadbalancer 26 corresponding to the source port being 2123. Where the destination port equals 2152, the source port may be equal to 2152. This represents the data pathway. Such port and source number numbering represent industry standard designations corresponding to signaling and data transmissions and, thus, are somewhat arbitrary and may be changed according to particular needs.

Generally, in the response to the request received by a selected GGSN 30a-b, the GGSN IP address may be manipulated appropriately. Hardware filters or any other suitable element may then be used to direct only the signaling traffic through software flow paths. Data may flow through the hardware or, in a specific embodiment, a component of the loadbalancing switch fabric that switches IP packets based on looking at only the corresponding IP information. The switch fabric may be a layer 3 switch fabric in a particular embodiment or any other suitable type of switch fabric in accordance with particular needs.

The removal of loadbalancer 26 from the data flow allows GGSNs 30a-b to provide for a greater subscriber base of end users 12. This may also allow for enhanced scalability and redundancy properties for communication system 10: both within and external to a cluster of communications. As a result, communications system 10 provides for increased bandwidth, simplification of communications management, and enhanced communication speeds associated with network communications.

FIG. 2B is a simplified timing diagram illustrating an example interaction between multiple elements that may be included within communication system 10. The process may begin at step 'A' where SGSN 18 communicates a primary create request to loadbalancer 26. A session is created by loadbalancer 26 at step 'B'. Additionally, loadbalancer 26 may initialize the number of PDP contexts to one in table 28 (e.g. via a connection counter). Loadbalancer 26 may then redirect the request to a selected GGSN 30a-c having the least number of PDP contexts. At step 'C,' a create response (cause request accepted) may be generated by a selected GGSN 30a-b and communicated to loadbalancer 26.

Loadbalancer 26 may forward a create response to SGSN 18 at step 'D.' At step 'E,' a secondary create request may be communicated to loadbalancer 26. The corresponding session may then be retrieved or looked up in table 28 at step 'F.' At step 'G,' loadbalancer 26 may forward the second create request to a selected GGSN 30a-b. At step 'H,' the number of PDP contexts may be incremented if the response is request-accepted. At step 'I,' loadbalancer 26 may forward this information to SGSN 18.

In this example (offered for purposes of teaching only), SGSN 18 may then communicate a delete request at step 'J' to loadbalancer 26. Loadbalancer 26 may note the teardown information element (IE). This may be forwarded to a selected GGSN 30a-b at step 'K.' If the response is request-accepted or non-existent, the PDP may be deleted. Additionally, the PDP contexts may be deleted if the teardown is set. These operations may be executed at step 'L.' At step 'M,' this information may be forwarded from loadbalancer 26 to SGSN 18. It is important to note that the timing diagram illustrated by FIG. 2B may be altered considerably and has been provided in an arbitrary fashion for purposes of example only. For example, delete request messages may be communicated to loadbalancer 26 at any appropriate time. The preceding example is only offered for purposes of teaching and accordingly should be construed as such.

FIG. 2C is a simplified block diagram of table 28 in accordance with one embodiment of the present invention. Table 28 may be provided internal to loadbalancer 26 or provided external to loadbalancer 26 and suitably coupled thereto. Table 28 may include any suitable software, hardware, algorithms, or other suitable elements to effectuate its operations. Table 28 may also include any suitable information associated with session objects, allocations made for each GGSN 30a-b, or other networking data in accordance with particular needs. Table 28 may additionally include an IP address column, a GSN type column, a recovery information element (I.E.) column, and a timer column. Such categories of information are not exhaustive and may certainly be added to or restricted significantly. The categories of information have been provided for purposes of example only and should be construed as such. Table 28 may be used in order to time responses to messages from selected GSNs in communication system 10. Table 28 may be suitably created or updated by loadbalancer 26 or appropriately configured or designed in accordance with particular needs.

A session object generally represents a communication tunnel or link. A suitable element may be provided internally to table 28 (or in cooperation therewith) that tracks the number of open PDP contexts for a given tunnel. For example, a network service access point identifier (NSAPI) may be provided to identify and record the number of open PDP contexts per tunnel. As loadbalancer 26 snoops or gleans information associated with secondary creates, this information may be taken into account when making a loadbalancing decision. Accordingly, a loadbalancing decision may be based on the total number of PDP contexts associated with a given GGSN 30a-b. After the communication of the primary create request, loadbalancer 26 may continue to inspect the signaling or data traffic that it receives. Table 28 may monitor the number of open tunnels and the number of open PDP contexts associated with these tunnels. Table 28 may comprise session objects and NSAPI objects, which reflect a number corresponding to the secondary PDP contexts. For example, a given tunnel may have sixteen NSAPIs.

The NSAPI may also identify the application being used by end user 12 (e.g. image session, web browser session, etc.). For example, voice over IP may require a higher quality of service than web traffic. Thus, a secondary PDP with a different NSAPI number may be provided that corresponds to a higher level of service for the voice over IP. Other data may simply traverse the other PDP provided. As used herein this document, 'PDP' connotes the relationship between end user 12 and a corresponding network node. Each PDP may additionally include information associated with quality of service or policy routing considerations, where such is appropriate. When an IP address is needed, a PDP context may need to be established. Each PDP context may be associated with an NSAPI, and each NSAPI may map to one primary or secondary PDP context. There are generally four bits allocated for NSAPIs with values of zero-four being reserved.

Loadbalancer 26 may also accommodate a number of other scenarios in order to effectively loadbalance information in a network environment. Table 28 may assist in this endeavor in certain embodiments where appropriate. For example, when SGSN 18 communicates a delete request to loadbalancer 26, table 28 may be referenced in order to identify a session corresponding to the delete request. The message sequence number may then be marked and forwarded by loadbalancer 26 to a selected GGSN 30*a-b*. The selected GGSN 30-*b* may match the sequence number in the delete response and, if the cause code is either non-existent or request-accepted, it may delete the PDP in the session and decrement the connection counter. For GTP version one, loadbalancer 26 may also inspect the teardown IE and, if set, delete the PDP contexts associated with the tunnel if the cause code is met. In addition, if the delete request is unanswered, the PDP may be deleted after a given timeout has expired. Loadbalancer 26 may cleanup the session when there are no more PDP contexts corresponding to the session.

Accordingly, in operation of an example embodiment, selected GSN may send a delete request to loadbalancer 26. The delete request may indicate to remove or to tear down designated communication sessions or tunnels. This may be effectuated using any suitable mechanism, such as a tear down indicator included in the message. Loadbalancer 26 may inspect this communication flow and accordingly respond by tearing down appropriate tunnels and cleaning table 28. Table 28 may then be suitably flushed after an appropriate timeout period. Such a scenario addresses another problem, when objects per PDP are maintained in loadbalancer 26 and delete messages are expected in each direction. Table 28 may be implemented to flush selected objects on a GSN timeout because loadbalancer 26 may not see the delete messages in cases where a selected GGSN 30*a* or 30*b* recognizes that a selected SGSN 18*a* or 18*b* is no longer responding. This may be the case where a recovery information element has changed and a selected GGSN 30*a* or 30*b* has recognized this change and thus corresponding communication tunnels are appropriately removed. Thus, there is no need to offer a delete request where a reload has been executed. Additional echoing messages generated by any element in the network are problematic because they may encounter coordination problems.

An update request may not affect the connection counter. Loadbalancer 26 may maintain or otherwise store a sequence number (for each signaling message request) for which to match the response and take appropriate action thereafter. The unanswered status of the request may be determined based on a configurable idle timer. Loadbalancer 26 may additionally monitor echo activity between GSNs and restart the counter, where appropriate, in the signaling messages. Loadbalancer 26 can maintain a timer corresponding to each GSN allowing the timer to be updated where echo activity (request or response) is detected from the GSN. If either the timer expires or a change in the restart counter is detected on a GSN, all of the sessions corresponding to the GSN may be deleted and the connection counter updated appropriately.

Additionally, loadbalancer 26 may be implemented effectively for network handoffs or handovers. Such a scenario may occur when end user 12 roams from one location to another. NSAPIs may be spread over multiple tunnels. Using PDP tracking provided by loadbalancer 26, the handoff may be accommodated between PDP contexts. This may be executed by creating two session objects that share an NSAPI table. Each NSAPI may belong to a different session.

Figure 3:
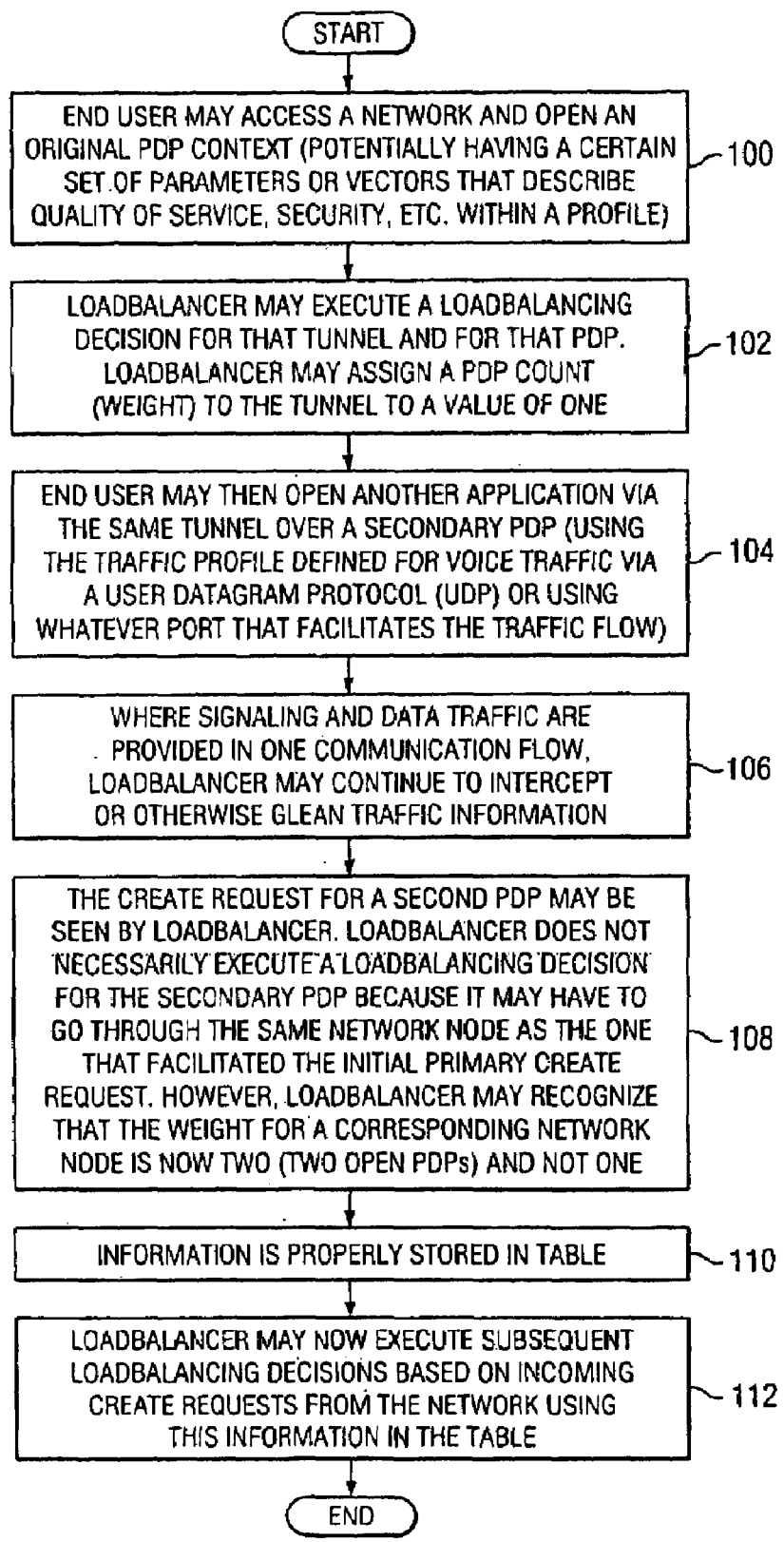
FIG. 3 is a flowchart illustrating a series of example steps associated with a method for loadbalancing in a network environment.

FIG. 3 is a simplified flowchart illustrating a series of example steps associated with a method for loadbalancing in a network environment. The method begins at step 100 where end user 12 may access a network and open an original PDP context (potentially having a certain set of parameters or vectors that describe quality of service, security, etc. within a profile). For example, web traffic may be communicated over the link because end user 12 has initiated his web browser via a GPRS phone. At step 102, loadbalancer 26 may execute a loadbalancing decision for that tunnel and for that PDP. Loadbalancer 26 may assign a PDP count to the tunnel to a value of one. Thus, loadbalancer 26 perceives the load or weight for a selected GGSN 30*a-b* as one (one connection and PDP context). End user 12 may then open another application via the same tunnel over a secondary PDP (using the traffic profile defined for voice traffic via a UDP or using whatever port that facilitates the traffic flow) at step 104. The quality of service for this application may be different and, where appropriate, billed differently by a network operator or service provider.

In cases where data and signaling traffic are separated, loadbalancer 26 may continue to inspect incoming signaling traffic in any suitable manner. Alternatively, where signaling and data traffic are provided in one communication flow, loadbalancer 26 may continue to intercept or otherwise glean traffic at step 106. The create request for a second PDP may be seen by loadbalancer 26 at step 108. Loadbalancer 26 does not necessarily execute a loadbalancing decision for the secondary PDP because it may have to go through the same GGSN as the one that facilitated the initial primary create request. However, loadbalancer 26 may recognize that the weight for a corresponding GGSN 30*a-b* is now two (two open PDPs) and not one. This information may be properly stored in table 28 at step 110. Loadbalancer 26 may now execute subsequent loadbalancing decisions based on incoming create requests from the network using this information at step 112. Loadbalancer 26 now is able to assess networking parameters more accurately in executing a loadbalancing decision.

Some of the steps illustrated in FIG. 3 may be changed or deleted where appropriate and additional steps may also be added to the flowchart. These changes may be based on specific communication architectures or particular interfacing arrangements and configurations of associated elements and do not depart from the scope or the teachings of the present invention.

Although the present invention has been described in detail with reference to IP communications, communication system 10 may be used for any tunneling protocol involving a redirection or handoff of communications in a loadbalancing environment. Any suitable communications that involve the transitioning between an initialization state and a data transfer state may benefit from the teachings of the present invention. The use of end user 12 and IP communications have only been offered for purposes of teaching and should not be construed to limit the scope of the present invention in any way.

In addition, communication system 10 may be extended to any scenario in which end user 12 is provided with mobility (in the context of a wired or a wireless connection or coupling) and communicates with some type of access server (e.g. a network access server (NAS), foreign agents, etc.). End user 12 may use a dedicated connection of some form or use forms of multiple access protocols where appropriate. Access may be associated with point to point protocol (PPP) or alternatively with layer three protocols over an L2 layer in accordance with particular needs. Such an embodiment may include any suitable tunnel terminators and/or tunnel initiators that may be operable to communicate with loadbalancer 26.

Moreover, although communication system 10 has been illustrated with reference to particular elements facilitating the loadbalancing process, these elements may be replaced by any suitable architecture or configuration that achieves the intended functionality of communication system 10. Loadbalancer 26 executes loadbalancing decision based on an accurate number of PDP contexts and therefore may receive information pertaining to such a decision via any suitable element or object. Additionally, loadbalancer 26 may execute loadbalancing decisions for any appropriate corresponding element using information provided, which is associated with an open number of PDP contexts for a given network node.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for loadbalancing in a network environment, comprising:
a loadbalancer operable to receive a primary create request from an end user for a communications link provided by a network node and to communicate a response to the end user in order to establish a communication session, the loadbalancer identifying a selected one of a plurality of network nodes to facilitate the communication session based on a number of packet data protocol (PDP) contexts associated with one or more of the network nodes, wherein the loadbalancer is further operable to receive a secondary request associated with the primary request, the loadbalancer inspecting the secondary request in order to determine whether the secondary request necessitates an additional PDP context, and wherein the loadbalancer may use the primary and secondary requests to assign a weight value for a corresponding selected one of the network nodes, wherein port-level filtering is invoked after the response is communicated to the end user such that separate data and signal pathways are established between the end user and the selected network node.

2. The apparatus of claim 1, wherein the loadbalancer includes a table operable to store information relating to open PDP contexts associated with one or more of the network nodes.

3. The apparatus of claim 1, wherein the loadbalancer establishes two session objects for a corresponding end user in order to facilitate a handoff as the end user roams from one geographic location to a different geographic location, and wherein one or more network service access point identifiers (NSAPIs) are spread over two communication links in order to effectuate the handoff, each of the NSAPIs tracking the number of open PDP contexts for a corresponding communication link.

4. The apparatus of claim 1, wherein a selected one or more of the network nodes include an echoing protocol operable to provide signaling for path awareness between one or more of the network nodes, and wherein one or more PDP contexts associated with a selected one or more of the network nodes may be deleted in response to monitoring the echoing protocol.

5. The apparatus of claim 1, wherein the loadbalancer is further operable to receive a delete request and to look up a selected communication session associated with the delete request, the loadbalancer matching a sequence number in the delete request and if a cause code is either non-existent or request-accepted the loadbalancer responds by deleting one or more PDP contexts associated with the selected communication session.

6. A method for loadbalancing in a network environment, comprising:
receiving a primary create request from an end user for a communications link provided by a network node; and
communicating a response to the end user in order to establish a communication session, wherein a selected one of a plurality of network nodes is identified to facilitate the communication session based on a number of packet data protocol (PDP) contexts associated with one or more of the network nodes, wherein a secondary request associated with the primary request is received and inspected in order to determine whether the secondary request necessitates an additional PDP context, the primary and secondary requests being used to assign a weight value for a corresponding selected one of the network nodes, wherein port-level filtering is invoked after the response is communicated to the end user such that separate data and signal pathways are established between the end user and the selected network node.

7. The method of claim 6, further comprising:
storing information relating to open PDP contexts associated with one or more of the network nodes in a table.

8. The method of claim 6, further comprising:
establishing two session objects for a corresponding end user in order to facilitate a handoff as the end user roams from one geographic location to a different geographic location, wherein one or more network service access point identifiers (NSAPIs) are spread over two communication links in order to effectuate the handoff, each of the NSAPIs tracking the number of open PDP contexts for a corresponding communication link.

9. The method of claim 6, further comprising:
receiving a delete request;
identifying a selected communication session associated with the delete request; and
matching a sequence number in the delete request and if a cause code is either non-existent or request-accepted, responding by deleting one or more PDP contexts associated with the selected communication session.

10. A system for loadbalancing in a network environment, comprising:
means for receiving a primary create request from an end user for a communications link provided by a network node; and
means for communicating a response to the end user in order to establish a communication session, wherein a selected one of a plurality of network nodes is identified to facilitate the communication session based on a number of packet data protocol (PDP) contexts associated with one or more of the network nodes, wherein a secondary request associated with the primary request is received and inspected in order to determine whether the secondary request necessitates an additional PDP context, the primary and secondary requests being used to assign a weight value for a corresponding selected one of the network nodes, wherein port-level filtering is invoked after the response is communicated to the end user such that separate data and signal pathways are established between the end user and the selected network node.

11. The system of claim 10, further comprising:
means for storing information relating to open PDP contexts associated with one or more of the network nodes.

12. The system of claim 10, further comprising:
means for establishing two session objects for a corresponding end user in order to facilitate a handoff as the end user roams from one geographic location to a different geographic location, wherein one or more network service access point identifiers (NSAPIs) are spread over two communication links in order to effectuate the handoff, each of the NSAPIs tracking the number of open PDP contexts for a corresponding communication link.

13. The system of claim 10, further comprising:
means for receiving a delete request;
means for identifying a selected communication session associated with the delete request; and
means for matching a sequence number in the delete request and if a cause code is either non-existent or request-accepted, responding by deleting one or more PDP contexts associated with the selected communication session.

14. Software for loadbalancing in a network environment, the software being embodied in a computer readable medium and including code operable to:
receive a primary create request from an end user for a communications link provided by a network node; and
communicate a response to the end user in order to establish a communication session, wherein a selected one of a plurality of network nodes is identified to facilitate the communication session based on a number of packet data protocol (PDP) contexts associated with one or more of the network nodes, wherein a secondary request associated with the primary request is received and inspected in order to determine whether the secondary request necessitates an additional PDP context, the primary and secondary requests being used to assign a weight value for a corresponding selected one of the network nodes, wherein port-level filtering is invoked after the response is communicated to the end user such that separate data and signal pathways are established between the end user and the selected network node.

15. The medium of claim 14, wherein the code is further operable to:
store information relating to open PDP contexts associated with one or more of the network nodes.

16. The medium of claim 14, wherein the code is further operable to:
establish two session objects for a corresponding end user in order to facilitate a handoff as the end user roams from one geographic location to a different geographic location, wherein one or more network service access point identifiers (NSAPIs) are spread over two communication links in order to effectuate the handoff, each of the NSAPIs tracking the number of open PDP contexts for a corresponding communication link.

17. The medium of claim 14, wherein the code is further operable to:
receive a delete request;
identify a selected communication session associated with the delete request; and
match a sequence number in the delete request and if a cause code is either non-existent or request-accepted, responding by deleting one or more PDP contexts associated with the selected communication session.

18. An apparatus for loadbalancing in a network environment, comprising:
a loadbalancer operable to receive a primary create request from an end user for a communications link provided by a network node and to communicate a response to the end user in order to establish a communication session, the loadbalancer identifying a selected one of a plurality of network nodes to facilitate the communication session based on a number of packet data protocol (PDP) contexts associated with one or more of the network nodes, wherein the loadbalancer is further operable to receive a secondary request associated with the primary request, the loadbalancer inspecting the secondary request in order to determine whether the secondary request necessitates an additional PDP context, and wherein the loadbalancer may use the primary and secondary requests to assign a weight value for a corresponding selected one of the network nodes, the loadbalancer including a table operable to store information relating to open PDP contexts associated with one or more of the network nodes, and wherein the loadbalancer is further operable to receive a delete request and to look up a selected communication session associated with the delete request, the loadbalancer matching a sequence number in the delete request and if a cause code is either non-existent or request-accepted the loadbalancer responds by deleting one or more PDP contexts associated with the selected communication session, wherein port-level filtering is invoked after the response is communicated to the end user such that separate data and signal pathways are established between the end user and the selected network node.

* * * * *